INVENTOR.
MARTIN H. LITTLE,
BY
Wolfe, Hubbard, Voit & Osann
ATTORNEYS.

Sept. 22, 1970    M. H. LITTLE    3,530,002
WATER-ACTIVATED, DRY CHARGED LEAD ACID STORAGE BATTERY
UTILIZING GELLED SULFURIC ACID ELECTROLYTE
PRECURSOR AND METHOD OF ACTIVATING SAME
Filed April 28, 1967    2 Sheets-Sheet 1
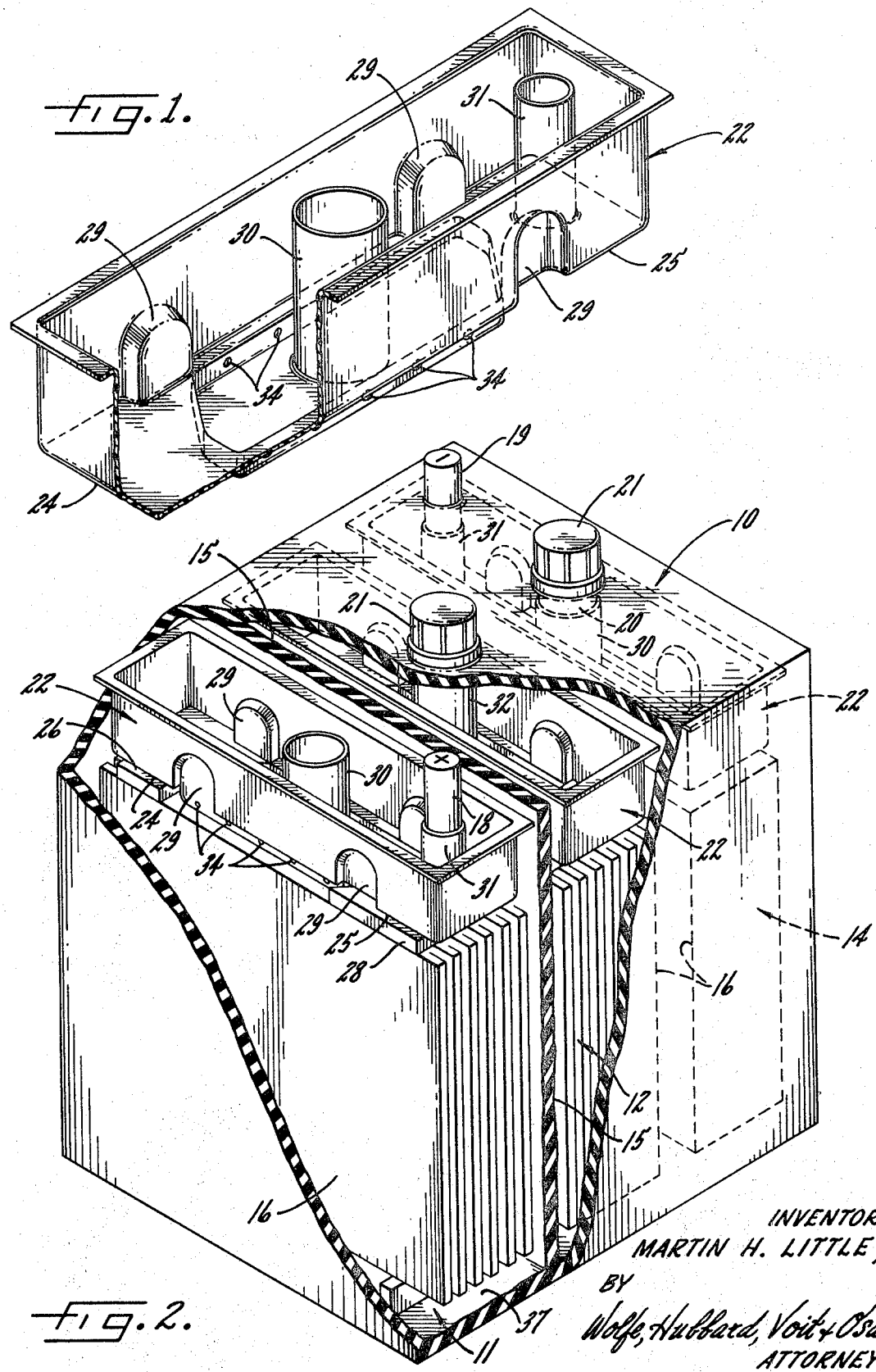
INVENTOR.
MARTIN H. LITTLE,
BY
Wolfe, Hubbard, Voit & Osann
ATTORNEYS.

United States Patent Office 3,530,002
Patented Sept. 22, 1970

3,530,002
WATER-ACTIVATED, DRY CHARGED LEAD ACID STORAGE BATTERY UTILIZING GELLED SULFURIC ACID ELECTROLYTE PRECURSOR AND METHOD OF ACTIVATING SAME
Martin H. Little, St. Paul, Minn., assignor to Gould-National Batteries, Inc., St. Paul, Minn., a corporation of Delaware
Filed Apr. 28, 1967, Ser. No. 636,238
Int. Cl. H01m 39/00
U.S. Cl. 136—26                               16 Claims

ABSTRACT OF THE DISCLOSURE

Lead-acid type storage batteries are stored in the dry-charged condition with an immobilized concentrated sulfuric acid maintained in the cell compartments but out of contact with the electrodes or plates. Preferred gel is concentrated sulfuric acid gelled with boron phosphate. Battery is activated by addition of water which dissolves gel and forms electrolyte in situ. An improved storage battery construction adapted for use with immobilized sulfuric acid is described.

BACKGROUND OF THE INVENTION

Field of the invention

This invention relates to secondary cells, or storage batteries, of the lead-acid type. More particularly, it concerns a dry charged lead-acid secondary cell activated by the addition of water.

Lead-acid storage batteries, having positive electrodes of lead peroxide, negative electrodes of sponge metallic lead, and an aqueous sulfuric acid solution as the electrolyte, are customarily stored before installation and use in either the "wet charged" or the "dry charged" condition. Wet charged batteries are those having the electrolyte in the cell compartments and thus in contact with the plates, while dry charged batteries are supplied, as the term suggests, with dry but active plates and with a separate container of sulfuric acid. In the latter case the user activates the battery by adding the sulfuric acid.

Although both wet and dry charged batteries are in widespread use, each has well recognized limitations. Wet charged batteries lose capacity during standing—as much as 1 percent per day—and consequently must either be kept on trickle charge or else periodically recharged. Further, this loss of capacity and the attendant necessary recharges are accompanied by grid corrosion and sulfation within the cell, which may limit the life of the battery when placed in service. On the other hand, while dry charged batteries do not require recharging and thus do not suffer from these effects, they have the inconvenience of storing and handling a separate container of sulfuric acid.

Ideally, it would be desirable to have a lead-acid storage battery that could be stored in the dry-charged condition and could be activated merely by adding water. Such a battery would avoid the requirement of periodically recharging a wet charged battery, and would eliminate the need for separate sulfuric acid storage and handling as in the dry charged battery.

Description of the prior art

It has previously been suggested that concentrated sulfuric acid as an electrolyte precursor be stored in containers within a battery cell compartment, the containers being ruptured or otherwise made accessible when the battery is to be activated. While such approaches are frequently satisfactory, they have certain disadvantages, one of which is permanent damage to the plates or electrodes by concentrated sulfuric acid should the container accidentally be ruptured before water is added.

It has also been proposed that concentrated sulfuric acid be immobilized by incorporating a salt or a gelling agent such as finely divided silica (Robinson British Pat. 785,848 of 1957), aluminum sulfate hydrate (Solomon U.S. Pat. No. 3,067,275 of 1962), and other metal sulfates (Kendall et al., J. Am. Chem. Soc., 43, 979–20 of 1921, and 42, 2132—42 of 1920). While these gels are effective in maintaining sulfuric acid out of contact with the plates until water is added, they frequently require a large proportion of gelling agent, which is inert when the battery is subsequently activated, and the agent in many instances does not dissolve in the electrolyte, leaving a residue which plugs the pores of the electrodes and the circulation channels. Additionally, certain of these gelling agents introduce soluble ingredients known to have a disadvantageous effect on battery performance.

OBJECTS AND ADVANTAGES

Overall objects and advantages of the present invention include: the provision of a water activated dry charged lead acid storage battery that may be stored in a dry charged condition and readily activated merely by the addition of water; the provision of such storage battery which is capable of delivering its charge shortly after activation; the provision of such battery which requires no external source of sulfuric acid electrolyte; and the provision of such battery having these particular advantages without any corresponding sacrifice in battery output.

Additional objects and advantages include the provision of an improved gel, or immobilized sulfuric acid electrolyte precursor: having a high concentration of sulfuric acid per unit volume; requiring only a percent or so of gelling agent; which completely dissolves upon the addition of water without solid residue or without introducing constituents harmful to normal battery operation; which is heat stable and which exhibits low syneresis during dry storage; and which is readily made, low in cost, and conveniently handled and used.

Further objects and advantages include the provision of a container for inclusion within a battery cell compartment and specially adapted for gelled sulfuric acid, which container features: controlled mixing of gelled sulfuric acid with water with resultant minimization of heat effects and damage to battery components by concentrated sulfuric acid; and which provides an effective gas space for the battery after the gel has been leached away.

Still other objects and advantages of the invention include the provision of a novel method for the addition of water to immobilized concentrated sulfuric acid within a battery cell compartment, which method avoids encountering the risk of excessively concentrated sulfuric acid contacting the battery plates and separators.

Other aims, objects, and advantages of the invention will be apparent from the ensuing detailed description of the invention.

SUMMARY OF THE INVENTION

Briefly, according to one aspect of the invention, a water activated dry charged storage battery is provided in which the precursor of the electrolyte is concentrated sulfuric acid gelled with boron phosphate. Upon the addition of water, the gel dissolves to liberate the sulfuric acid and therby form electrolyte in situ to activate the battery.

In another aspect, an improved storage battery is provided which features a novel container for retaining gelled sulfuric acid above the battery electrodes, and so arranged such that the addition of water submerges the plates before contacting the gelled sulfuric acid within the container.

BRIEF DESCRIPTION OF DRAWINGS

Preferred forms of the present invention are illustrated with reference to the appended drawings, wherein:

FIG. 1 is a perspective of a gelled sulfuric acid container for use with a water activated, dry charged, lead acid storage battery;

FIG. 2 is a perspective, partially in section, showing a three cell storage battery according to the invention and employing the container of FIG. 1;

DESCRIPTION

(1) Manufacture of plates

Figure 3:
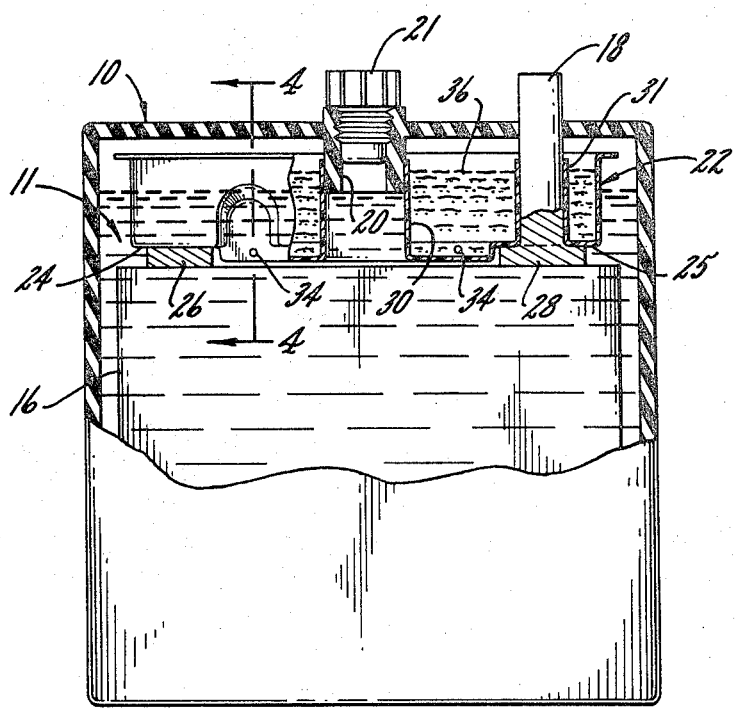
FIG. 3 is a side view in partial section of the battery of FIG. 2.

The plates or electrodes employed in the storage battery of the present invention may be manufactured by any technique used in making conventional lead peroxide positive electrodes and sponge metallic lead negative electrodes for dry charged batteries. Indeed, a particular advantage of the present invention is that the gelled sulfuric acid technique may be incorporated into ordinary dry charged lead acid storage batteries with only slight modification in battery design and construction.

The technical literature describes many methods for making dry charged lead acid storage battery plates. One such literature reference is Kirk-Othmer's "Encyclopedia of Chemical Technology," 2nd ed., vol. 3, pp. 249 through 271, including the bibliography. Accordingly, no further description is necessary with respect to the manufacture of battery plates, separators, and other conventional components, for those skilled in the art.

(2) Preparation of gelled acid

Concentrated sulfuric acid gelled with boron phosphate may be prepared simply and conveniently under a wide variety of conditions and over a fairly broad range of acid and gelling agent concentrations. An investigation of this system has been reported in the literature (Leicester, J. Soc. Chem. Ind. (London), 67, 433–4, of 1948).

According to the preferred method of preparing the gel, a concentrated sulfuric acid solution of orthoboric acid ($H_3BO_3$, or boric acid), or equivalent boron-affording substance, is mixed with a concentrated sulfuric acid solution of phosphoric acid ($H_3PO_4$) or its equivalent. Shortly after mixing—the time being dependent on temperature, with higher temperatures giving more rapid gelling—a gel forms which immobilizes the sulfuric acid. Although there is some question as to the precise mechanism of gel formation, and indeed even to the chemical nature of the gelling agent, the following schematic reaction depicts one theory:

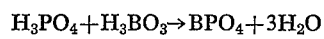
$$H_3PO_4 + H_3BO_3 \rightarrow BPO_4 + 3H_2O$$

A similar reaction occurs with related materials, allowance being made for the specific material being used. Thus, the amount of water evolved is minimized or eliminated by employing phosphoric anhydride and/or boric anhydride. For other suggested boron compounds, see the previously cited Kirk-Othmer reference, page 608 and following.

Concentrated sulfuric acid, as used in preparing the gel, may be any concentration which forms a suitably firm gel under the gel formation conditions selected, and which is sufficiently concentrated to provide the required sulfuric acid concentration when water is added to activate the cell. Thus, it has been reported that boron phosphate will gel sulfuric acid at a concentration of as low as 82 percent $H_2SO_4$ and as high as 10 percent oleum, although it appears that a concentration of at least 85 percent sulfuric acid, and preferably 96–100 percent sulfuric acid, is both useful and convenient to work with. Oleum acid has the extra advantage of removing any water that forms when boron phosphate is produced, in addition to affording a more concentrated sulfuric acid gel.

The proportion of boron phosphate to sulfuric acid may also vary over wide ranges, illustratively from about one mol of boron phosphate to about forty mols (or less) of sulfuric acid, up to about one mol per two hundred mols of sulfuric acid (or even more). Proportions of one mol of boron phosphate to twenty mols of sulfuric acid have also been used, but the gellation time is somewhat inconveniently rapid. Proportions of 1:50 and 1:100 give excellent results.

As indicated earlier, it is believed that there is an equimolar reaction between phosphoric acid and boric acid to form the boron phosphate gelling agent in situ. Although this may be varied, there appear to be no advantages to having an excess of either ingredient.

In an illustrative gel preparation, a solution of one mol 85 percent phosphoric acid in twenty-five mols of 100 percent sulfuric acid is mixed with a second solution of one mol of boric in twenty-five mols of 100 percent sulfuric acid. When mixing occurs at room temperature, a gel forms in about to to three hours, whereas mixing near 100° C. produces a gel in five or six seconds. The gel is quite stable in the absence of water, and retains its stability at temperatures above 100° C. Syneresis is minor, amounting to one or two percent liquid from a 1:50 ratio gel after several months.

(3) The drawings

Referring now to the drawings, particularly FIGS. 1 and 2, a water activated, dry charged, lead acid type storage battery according to the invention is illustrated.

The battery 10 is an acid resistant case of hard rubber, polypropylene, or the like having three cells 11, 12, 14, separated into corresponding cell compartments by separators 15.

Each cell or compartment 11, 12, 14 contains a stack 16 of alternating lead peroxide positive electrodes and sponge metallic lead negative electrodes, or plates, separated by foraminous plate separators. For clarity, the electrode stack 16 is shown symbolically, as these electrodes form no part of the present invention.

Protruding from the top of battery 10 are positive terminal 18 and negative terminal 19, together with a vent well 20 for each of cells 11, 12, 14. Vent caps, illustrated by cap 21, are threaded onto the several vent wells 20.

Within the cell compartments, as best shown in FIG. 2, are the gelled sulfuric acid containers 22, one for each cell compartment. These containers 22 are open topped trough-like containers made of an acid resistant material such as polyethylene or polypropylene, vacuum molded to the appropriate shape.

As further shown in FIG. 2, the bottom of containers 22 have recesses 24, 25, to conform with plate connectors 26, 28, respectively, and one or more side recesses 29 to conform with the intercell connector, not shown.

Additionally, each container 22 has one or more chimney-like ports extending from the bottom of container 22 to a level at or near the top of the container. Those containers 22 which are in the end cells 11, 14 are provided with two such ports 30, 31, whereas containers in central cells such as cell 12 have only one such port, 32. One port in each container, e.g., port 30 in cell 11 and port 32 in cell 12, is disposed immediately under and around vent well 20 (as shown in FIGS. 2 and 3), and is for the admission of water to activate the battery. The other well 31 in each of the containers 22 disposed in the end cells 11, 14 surrounds the respective posts or terminals 18, 19, which extend from plate connectors such as connector 28.

Containers 22 are provided with a plurality of water access ports 34 near the bottom of the container, all the ports 34 preferably being at one vertical level. Thus, insofar as possible, liquid entering the ports 34 will tend to enter each port at approximately the same time and at the same rate.

Figure 4:
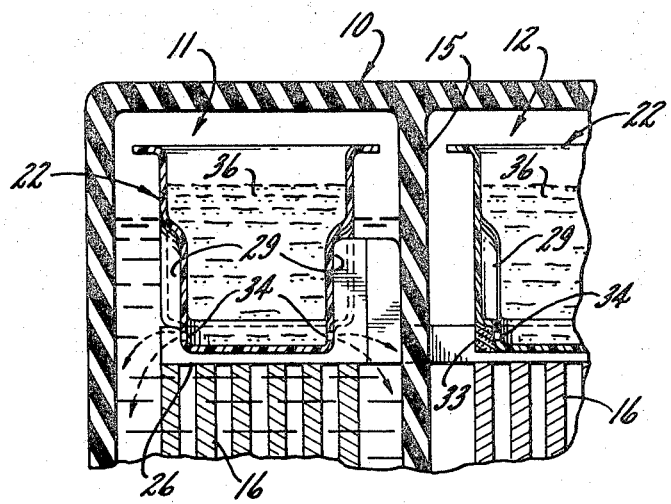
FIG. 4 is a section showing one preferred form of the container of FIG. 1.
Figure 4A:
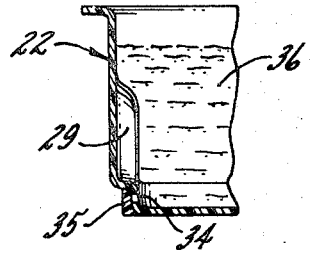
FIG. 4a is an alternative sectional view of the container shown in FIG. 1.

Referring now to FIGS. 1, 4, and 4a, these water access ports 34 are advantageously sealed with a sulfuric acid insoluble, water soluble cover 33 or 35. In the embodiment depicted in FIG. 4a, the cover 35 comprises a material, typified by polyethylene oxide or polypropylene oxide, which is insoluble in sulfuric acid but which dissolves in water when water is added to activate the battery. Thus, the cover 35 effectively seals the ports 34 against leakage until water is added.

In keeping with the invention, the container 22 is filled with a freshly mixed but yet ungelled concentrated sulfuric acid-boron phosphate solution to a level dictated by the acid requirements of the battery 10. When the solution gels, the gel is thus retained in container 22, and the entire container with its gelled sulfuric acid electrolyte precursor may be assembled into cells 11, 12, 13 before the top of battery 10 is sealed into place. In this respect, it is unnecessary that container 22 be physically sealed to the top of battery 10 or to the cell walls, although such sealing may be accomplished if desired. However, the absence of any sealing permits the container 22 to serve as a gas space after the gel has been leached out in the manner of the gas space of a conventional lead acid storage battery.

Certain additional features may be employed if desired. For example, the sediment well 37 beneath each stack 16 of plates or electrodes may be filled with additional gelled sulfuric acid. This procedure is desirable when the amount of space in cells 11, 12, 14 is limited and, for particular purposes, one may not wish to employ oleum in the gel.

(4) Storage and activation

During storage of the battery 10 and before activation thereof by addition of water, the electrodes or plates will, of course, be in the dry charged condition and the gelled sulfuric acid in container 22 will be disposed above and out of contact with the plates. In this condition, and with hermetic sealing of the cells (e.g., by temporarily sealing gas parts in vent cap 21 with an adhesive-backed moisture proof tape), the battery may be stored, shipped, and handled for many months or even years without significant loss of dry charge retention or capacity.

To activate the battery, it is merely necessary to remove temporarily the vent caps 21 and add water via vent well 20 and vent ports 30, 32, which extend vertically through containers 22.

As depicted in FIG. 3, the water passes through the vent ports 30, 32 without contacting the gelled sulfuric acid 36 in container 22 until the stack of electrodes or elements 16 is completely submerged.

It will be noted that the plates are submerged in water before there is any contact of water with gelled sulfuric acid. Thus, the sensitive plates and plate separators are fully protected against the destructive heat and oxidizing effect of concentrated sulfuric acid, which has heretofore been a significant disadvantage of many prior art designs for water activated lead acid storage batteries.

However, when the level of water reaches the level of water access ports 34 near the bottom of container 22, the water passes through the ports (after penetrating any cover 33 or 35 in FIGS. 4 or 4a, respectively) and begins leaching the gelled concentrated sulfuric acid 36. The provision of a sufficient number of small sized ports 34 permits relatively slow leaching of the gel at a number of locations, with the result that the gel is slowly and controllably dissolved without excessibe heat effects.

As the gel dissolves, the heavy sulfuric acid diffuses outward via water access port 34 and then down through the stack 16 of positive and negative plates and plate separators. Otherwise stated, dissolution of the gelled sulfuric acid by water forms an electrolyte of the desired concentration in situ, and the electrolyte is immediately available to activate the battery.

As gases form upon contact of the plates by sulfuric acid, the gas bubbles rise around and in (via water access ports 34) container 22, as best shown in FIG. 3. Gas is free to escape via a port (not shown) in the side of vent well 20 above the level of vent port 30, 32, and discharges to the atmosphere via a vent port (not shown) in vent cap 21.

It will be understood that the concentration of sulfuric acid in the gelled sulfuric acid mass 36 in containers 22, together with the size of the containers 22, is selected such that addition of a predetermined amount of water will produce an electrolyte of the desired sulfuric acid concentration. Typically, automotive storage battery electrolytes are approximately 35 percent $H_2SO_4$, although this concentration may be varied depending upon the manufacturer's selection of electrode materials and the expected environment of battery use.

By way of orientation, a gel prepared from 100 percent sulfuric acid and containing 2 percent by weight of boron phosphate will have a density of 1.84 grams per cc., and will contain 1.74 grams of 100 percent $H_2SO_4$ per cc. of gel. As those skilled in the art will appreciate, this sulfuric acid concentration is as high as, or higher than, the available sulfuric acid concentration in gels of 100 percent $H_2SO_4$ thickened by many other thickening agents.

SUMMARY

Thus it is apparent that there has been provided, in accordance with the invention, a water activated, dry charged, lead acid type storage battery that satisfies the objects, aims, and advantages set forth earlier.

While the invention has been described in connection with a preferred embodiment, it will be understood that it is not intended to limit the invention thereto, but it is intended to cover all modifications and alternative constructions falling within the spirit and scope of the invention as expressed in the appended claims.

I claim as my invention:

1. In a lead sulfuric-acid storage battery having a lead peroxide positive electrode and a sponge metallic lead negative electrode, the improvement in combination therewith comprising a precursor of sulfuric acid electrolyte comprising sulfuric acid gelled with boron phosphate, whereby the addition thereto of water dissolves said gel, forms sulfuric acid electrolyte in situ, and activates said battery.

2. Battery of claim 1 wherein said electrolyte precursor is disposed above, and out of contact with, said electrodes.

3. Battery of claim 1 including means for adding water so that said water submerges said electrodes before contacting said sulfuric acid gelled with boron phosphate.

4. Battery of claim 1 wherein said sulfuric acid gelled with boron phosphate is prepared by mixing a concentrated sulfuric acid solution of a member selected from the group consisting of boric acid and boric anhydride, with a concentrated sulfuric acid solution of a member of the group selected from phosphoric acid and phosphoric anhydride.

5. Battery of claim 1 wherein said sulfuric acid gelled with boron phosphate is in the proportion of about one mol of boron phosphate to about 40–200 mols sulfuric acid.

6. Battery of claim 1 wherein said sulfuric acid is at a concentration within the range of about 85 weight percent to about 10 percent oleum.

7. A water activated, dry charged, lead acid storage battery comprising:

(1) at least one cell with a plurality of lead peroxide positive plates and a plurality of sponge metallic lead negative plates in said cell, said cell being free of electrolyte in contact with said plates while said battery is being stored before activation, (2) an open receptacle containing a material consisting essentially of gelled concentrated sulfuric acid disposed in said cell above said plates, said receptacle constructed to receive water added to said cell for contacting said gelled concentrated sulfuric acid, and (3) means in said cell for adding water to said cell and constructed and arranged so that said water submerges said plates before contacting said gelled concentrated sulfuric acid.

8. Battery of claim 7 wherein said cell is hermetically sealed before activation.

9. Battery of claim 7 wherein said container has water access ports near the bottom thereof at only one level.

10. Battery of claim 7 wherein said ports are sealed with a sulfuric acid insoluble, water soluble, cover.

11. Battery of claim 10 wherein said cover comprises a member of the group consisting of polyethylene oxide and polypropylene oxide.

12. Battery of claim 7 wherein said container is an open-topped trough having a water addition conduit extending vertically therethrough.

13. Battery of claim 7 including magnesium oxide disposed in said cell to neutralize syneresed sulfuric acid.

14. In a water activated, dry charged, lead sulfuric-acid storage battery having
at least one cell with a plurality of lead peroxide positive plates and a plurality of sponge metallic lead negative plates in said cell, said cell being free of electrolyte in contact with said plates while said battery is being stored before activation,
the improvement in combination therewith comprising:
a container of an electrolyte precursor comprising concentrated sulfuric acid gelled with boron phosphate, said gelled concentrated sulfuric acid being accessible to water added to said cell, and
means for adding water to said cell so that said water submerges said plates before contacting said gelled concentrated sulfuric acid.

15. A method of storing and then activating a water-activated, dry charged, lead acid storage battery comprising:

(1) storing, in the dry charged condition, a battery having
(a) at least one cell with a plurality of lead peroxide positive plates and a plurality of sponge metallic lead negative plates in said cell, and
(b) concentrated sulfuric acid disposed in said cell above said plates, said cell being free of liquid electrolyte in contact with said plates while said battery is being stored, and (2) adding water to said cell so that said water submerges said plates before contacting said gelled concentrated sulfuric acid, to thereby protect said plates from concentrated sulfuric acid, dissolve said gel, form electrolyte in situ, and activate said battery.

16. Method of claim 15 wherein said gelled concentrated sulfuric acid comprises sulfuric acid gelled with boron phosphate.

References Cited

UNITED STATES PATENTS

| | | | |
|---|---|---|---|
| 431,447 | 7/1890 | Dixon | 136—26 |
| 3,375,138 | 9/1963 | Mather | 136—153 |
| 305,737 | 9/1884 | Case | 136—26 |
| 1,748,485 | 2/1930 | Kugel | 136—154 |
| 1,749,665 | 3/1930 | Diltz | 136—154 |
| 1,895,620 | 1/1933 | Gale et al. | 136—26 |
| 2,035,315 | 3/1936 | Harner et al. | 136—26 |
| 2,832,814 | 4/1958 | Shannon | 136—90 |
| 2,929,860 | 3/1960 | McCallum et al. | 136—154 |
| 3,131,094 | 4/1964 | Cleveland | 136—90 |
| 3,150,012 | 9/1964 | Tanaka | 136—157 |
| 3,291,644 | 12/1966 | Gray et al. | 136—90 |
| 3,304,202 | 2/1967 | Sam | 136—26 |
| 3,375,142 | 3/1968 | Concannon | 136—90 |

WINSTON A. DOUGLAS, Primary Examiner

C. F. LeFEVOUR, Assistant Examiner

U.S. Cl. X.R.

136—157